Oct. 20, 1964 W. H. LEAVENGOOD ETAL 3,153,489
RAMP CAR
Filed July 10, 1962 4 Sheets-Sheet 1

INVENTORS
W. H. Leavengood &
R. D. Thomas
BY
Mason, Fenwick & Lawrence
ATTORNEYS INVENTORS
W. H. Leavengood &
R. D. Thomas
BY Mason, Fenwick & Lawrence
ATTORNEYS Oct. 20, 1964 W. H. LEAVENGOOD ETAL 3,153,489
RAMP CAR
Filed July 10, 1962 4 Sheets-Sheet 4
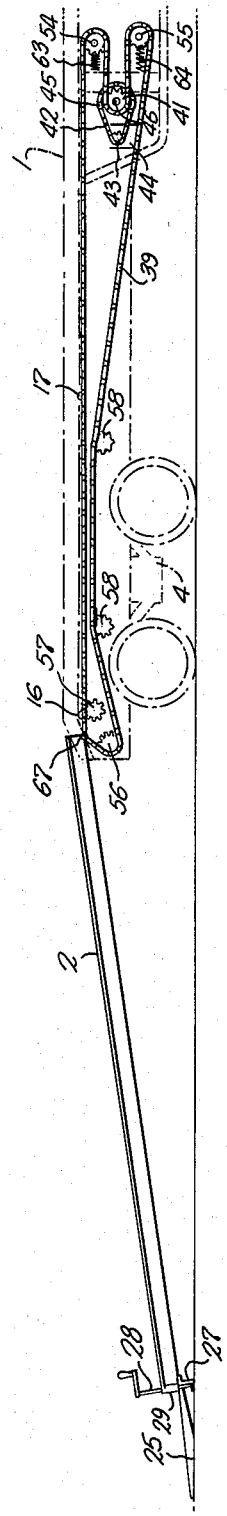
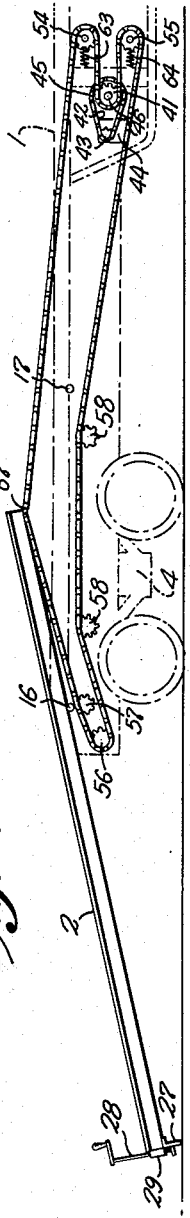
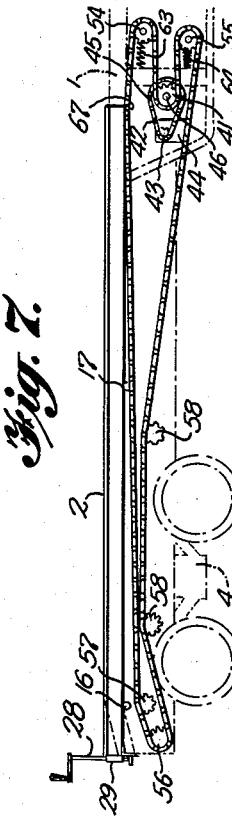
INVENTORS
W.H. Leavengood &
R.D. Thomas
BY Mason, Fenwick & Lawrence
ATTORNEYS

United States Patent Office 3,153,489
Patented Oct. 20, 1964

3,153,489
RAMP CAR
William H. Leavengood and Reppard D. Thomas, Savannah, Ga., assignors to Central of Georgia Railway Company, Savannah, Ga., a corporation of Georgia
Filed July 10, 1962, Ser. No. 208,727
10 Claims. (Cl. 214—85)

This invention relates to railway cars, and particularly to railway cars having self-stowing loading ramps.

The practice of transporting highway truck trailers by rail on flat cars has become quite extensive. It provides an economical method of moving trailer loads of goods from shipping point to destination. Loading and unloading the trailers on and off flat cars has presented some problems, particularly in areas where there is insufficient rail traffic to justify permanent loading docks or ramps. Where these conditions exist, it is necessary to bring in a portable ramp or to improvise a temporary structure.

The general object of the present invention is to provide a standard rail car equipped with loading ramps which will supply the necessary structural members to accommodate tractor-trailer combinations for hauling trailers on and off the flat car, and, when stowed, become part of the rail car deck.

A more specific object is to provide a car so equipped having novel means for moving the ramps to and from operative and stowed positions.

Another object is the provision of such a car having ramp structure at each end, so that a ramp will be available for use regardless of which end of the car is connected to a train, and the ramp not in use will provide a bridge from the ramp car to the next adjacent car.

A further object of the invention is to provide a ramp car wherein the ramp mechanism is capable of operation by one man.

Other objects of the invention will become apparent from the following description of one practical embodiment thereof, when taken in conjunction with the drawings which accompany, and form part of, this specification.

In the drawings:

FIGURE 5 is a diagrammatic view of the car, illustrating the ramp in fully extended, loading position, and showing the arrangement of the ramp actuating chain and its load compensating mechanism;

FIGURE 6 is a view similar to FIGURE 5 showing the ramp partially withdrawn toward stowing position, and in at the point of equilibrium; and FIGURE 7 is another view similar to FIGURE 5, showing the ramp in stowed position.

Figure 1:
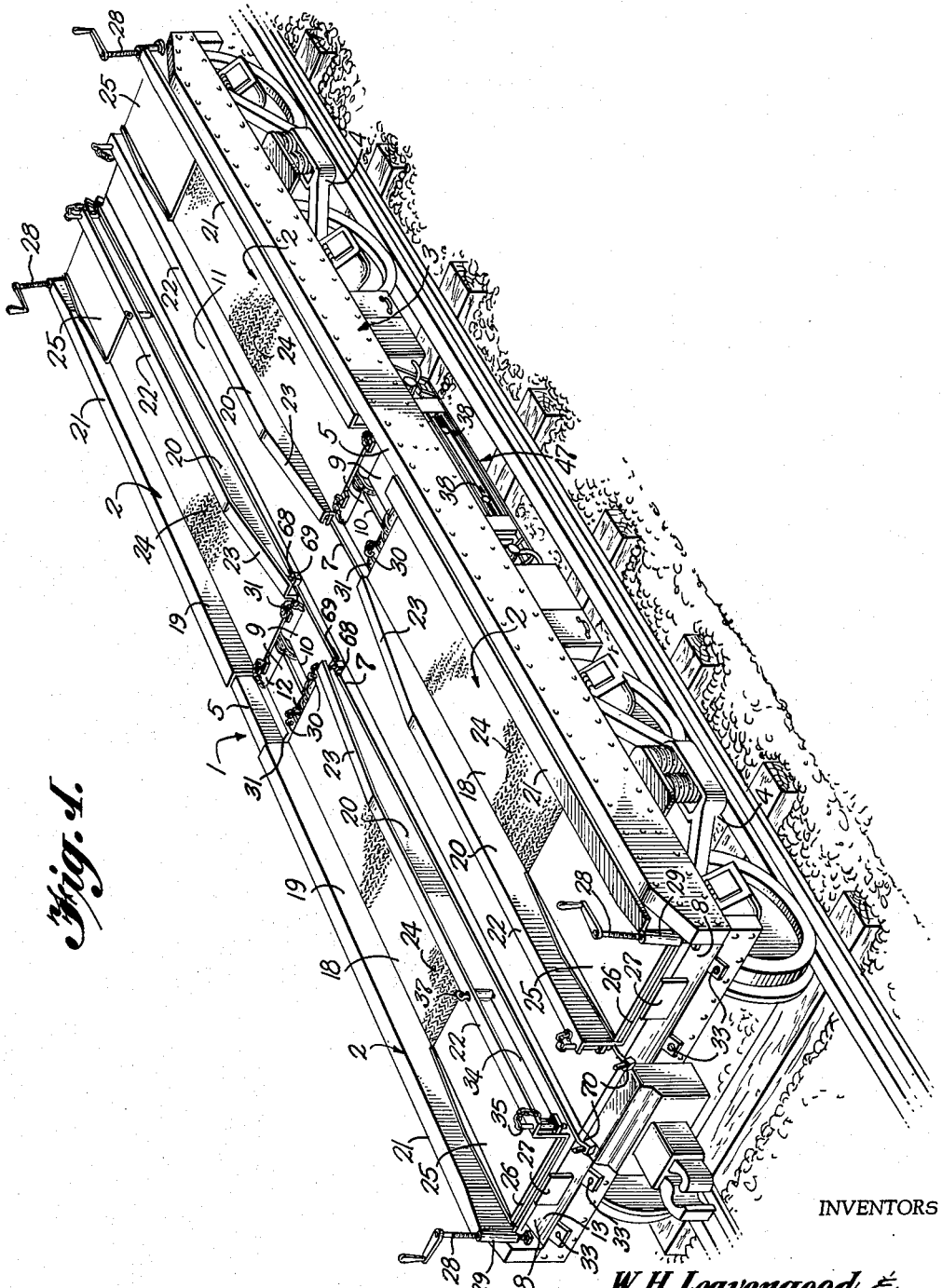
FIGURE 1 is a perspective view of a railway ramp car embodying the principles of the present invention, with the ramps being shown in stowed position.

Referring to the drawings in detail, there is illustrated a flat car 1 equipped with ramp assemblies 2 at either end.

The car understructure can be of any suitable construction, and is shown as including a bed frame 3 mounted on the usual trucks 4. The bed frame has side rails 5 interconnected by a plurality of parallel, spaced cross members 6. Spaced inwardly from each side rail, and parallel thereto, is an inner rail 7 extending the full length of the car and secured to the cross members. The side rails 5 and the inner rails 7 form, respectively, outer and inner guide rails of runways 8 which also form ramp-receiving channels. A pair of bed plates 9 form bottoms for the runways 8. The plates 9 of each runway are spaced from one another to provide a central slot 10 extending the lengths of the runways. A central deck plate 11 may be used, so that the major part of the car will be decked over.

Figure 2:
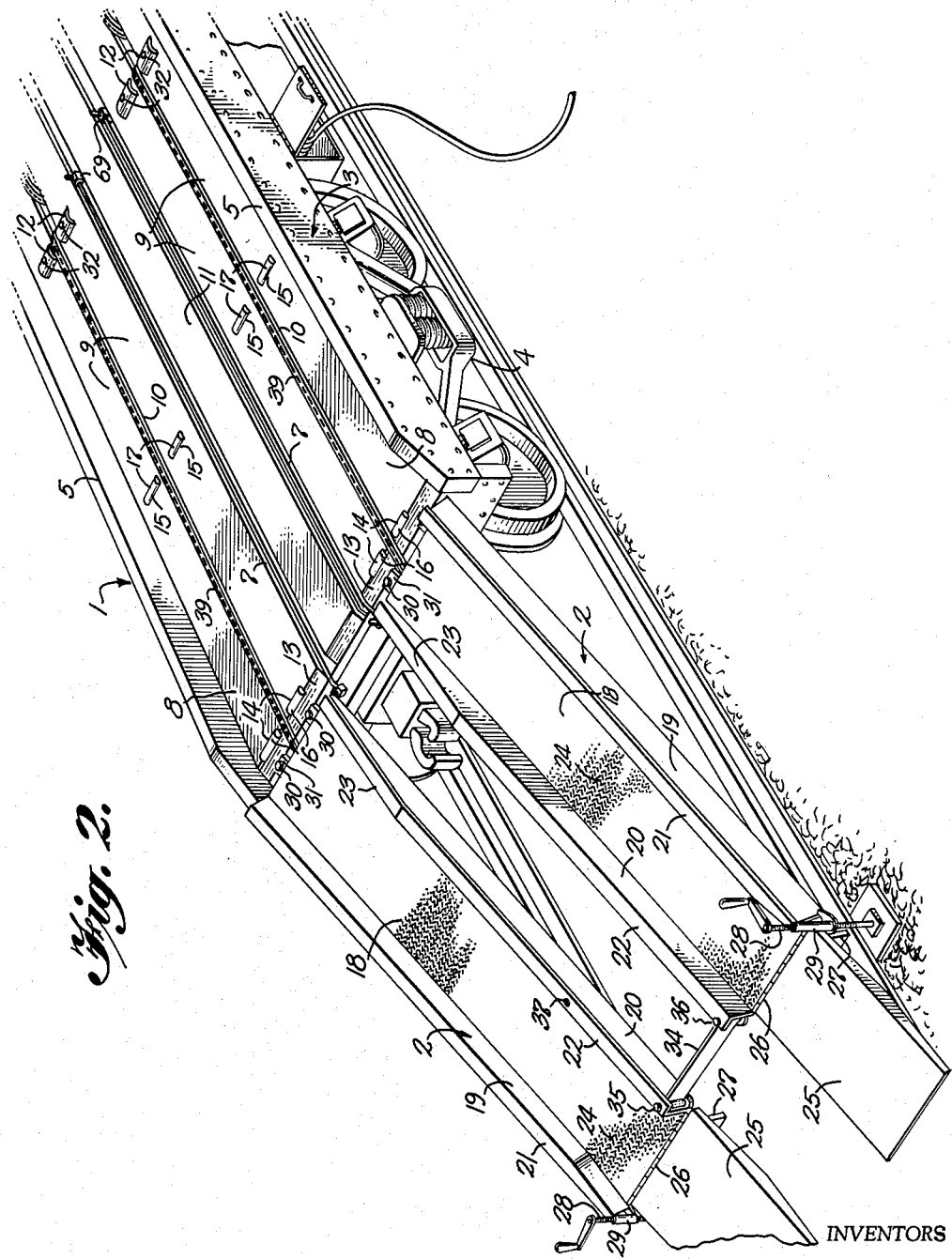
FIGURE 2 is a perspective view of one end of the car, illustrating the ramp in operative, or loading, position.
Figure 3:
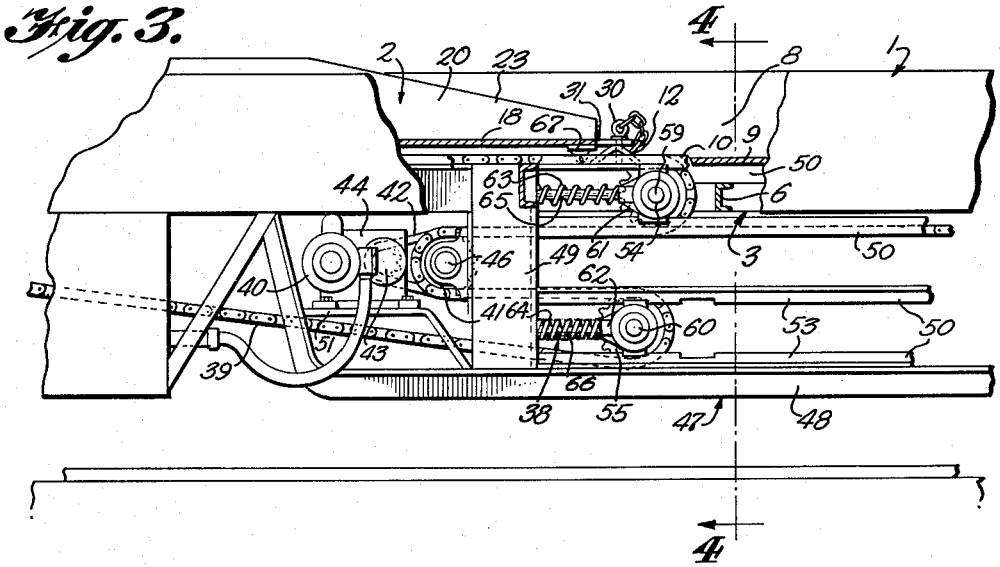
FIGURE 3 is a fragmentary side elevation of the central part of the car showing a portion of the ramp moving mechanism, parts being shown in section for clarity.

Each runway 8 is divided to make provision for stowing two ramps, one at each end. The end of each channel section is defined by cross-over plates 12, fixed to the bed plates 9. These provide transfer bridges from the stowed ramps to the runway plates, and convenient members to which the stowed ramps may be secured, as will be described. The opposite ends of the channel sections, that is those ends at the ends of the car, decline as at 13, best seen in FIGURES 1 and 2, and diagrammatic FIGURES 5, 6 and 7. The runway plates are transversely slotted, as at 14 and 15, and the upper surfaces of rollers 16 and 17, mounted beneath the plate, project through the slots to form bearing surfaces for the ramp during movement to and from operative position, and support surfaces for the ramps when stowed. It is to be noted particularly that rollers 16 are located at the juncture of the horizontal sections of the plates with the declining ends 13. The rollers provide rolling fulcrums about which the ramps may tilt during movement.

The ramps 2 are elongated trough-shaped members having bottoms 18, sides 19 and 20 and outwardly extending flanges 21 and 22 at the tops of the sides. The inner sides 20 have their heights reduced, as at 23, adjacent their inner ends, so that they will not interfere with the undercarriages of trailers passing over the ramps onto the ramp channels. The ramp bottoms may be roughened, as at 24, or covered with a suitable material to provide proper traction for vehicles.

Each ramp has a bridge 25 at its leading end to form a lead plate from the ground to the trailer when the ramp is in position for loading and unloading, and a bridge between the ramp car and a car coupled to it when the ramp is in stowed position. The bridges 25 are connected to the ramp ends by hinges 26.

The loading end of each ramp has a foot 27 for contact with the ground for preliminary positioning as the ramp is first extended. Jack screws 28, threaded through sleeves 29 are provided for proper leveling of the ramp end, as will be described.

The ramps are held in their operative and stowed positions by means of lock pins. Pins 30 passing through tongues 31 at the trailing ends of the ramps and into openings 32 in the cross-over plates 12 hold the ramps in stowed position. The same pins passing through the tongues 31 and openings 33 at the car end of the ramp channels will pin the ramp in operative position. A brace bar 34, pinned to the end of one ramp by a pivot pin 35 and releasably fixed to the end of the other ramp of a pair by pin 36, holds the ramps of the pair in proper spaced, parallel relation when in operative position. Pin 36 may be withdrawn and the brace bar swung about its pivot to lie against the side wall of the ramp that carries it when the ramps are to be stowed. A pin 37 on the ramp having the pivot pin 35 locks the bracer bar in inoperative position.

The ramps are moved to and from operative position each by its own drive means 38. This consists of a drive chain 39, working through slots 10 between the channel plates 9, driven from a motor 40. The motor may be a simple reversible 110–115 volt electric motor operable from any convenient electric source outlet. The motor powers a drive sprocket 41 for the chain 39 by means of a chain 42 passing over a sprocket 43, on a gear reducer 44 connected to the motor, and a sprocket 45 fixed to shaft 46 which carries drive sprocket 41. The motor, gear reducer and shaft 46 are all mounted on a frame 47 suspended from the underside of the car.

Figure 4:
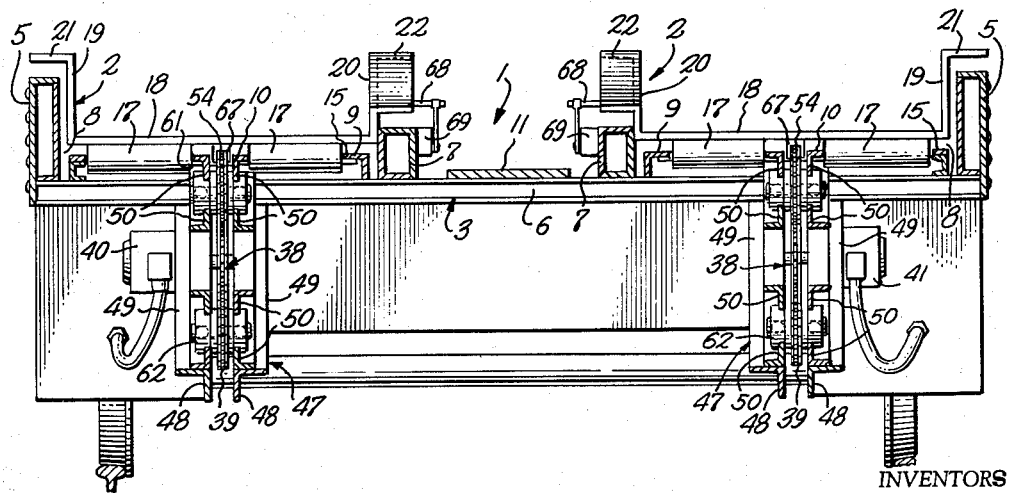
FIGURE 4 is a transverse section through the car body, taken on the line 4—4 of FIGURE 3.

The frame 47 includes an outer truss frame 48, vertical struts 49 extending from the car frame to the truss frame, and slide rails 50 running from one strut 49 to the next. The motor and reducer are mounted on a platform 51, fixed to the truss frame, and shaft 46 is journalled in bearings on the strut 49 adjacent the motor platform. The slide rails are arranged in pairs, an upper pair 52 and a lower pair 53. The structure just described is duplicated on each side of the car and mechanisms for driving the two ramps at opposite ends in each side are mounted in a single frame 47. That is, a mechanism 38 for operating the ramp at one end of the car is located at the adjacent end of frame 47, while a mechanism 38 for operating the ramp at the other end of that side of the car is located in the other end of the same frame 47 (see FIGURE 1). It is to be noted that each frame 47 consists of two identical sections spaced apart transversely to provide a central open area in which the drive chain 39 may move (see FIGURE 4).

Chain 39 is trained over drive sprocket 41, a pair of floating chain tensioning sprockets 54 and 55, a sprocket 56 at the car end, upper guide sprocket 57 and lower guide sprockets 58. Sprockets 56, 57 and 58 are mounted on shafts fixed to the frame in any desired manner. The important factors are that sprockets be at substantially the same peripheral level as tensioning sprocket 54 so that at times chain 39 may have a level upper flight, and sprocket 56 be at a lower level than sprocket 54.

Tensioning sprockets 54 and 55 are mounted on shafts 59 and 60, journalled in slides 61 and 62, slidable along rails 50, slide 61 riding between the upper pair 52 and slide 62 between lower pair 53. Slides 61 and 62 are biased to hold sprockets 54 and 55 in chain tensioning position by means of springs 63 and 64. The springs encircle rods 65 and 66 which are connected to the slides and journalled in the adjacent vertical struts 49. The springs bear against the slides and struts to yieldingly force the slides away from the struts.

The ramps are connected at their inner ends to their respective operating chains by suitable clips 67. The several mechanisms are controlled by movement of the ramps, each ramp carrying a control rod 68 which strikes limit switches 69 and 70 at the limits of its travel to stop the drive motor.

When it is desired to lower the ramps for loading or unloading trailers, the lock pins 30 are withdrawn from the openings in plates 12 to release the ramps for movement The ramps can be lowered independently or the drive mechanisms for both ramps may be operated together. When a drive motor 40 is started, the chain 39 driven by it will start to move in a counterclockwise direction as viewed in FIGURES 5, 6 and 7. The force of the pull will be imposed from the point of attachment 67 of the chain to the ramp in a counterclockwise direction upon the tension sprocket 55. This will cause sprocket 55 to move slightly inwardly, compressing its spring 64. There will be a compensating outward movement of sprocket 54. As the chain begins to move, the ramp will be carried rearwardly, rolling on the rollers 16 and 17. When a major portion of the ramp has moved beyond the roller 16, the weight of the overhanging portion will tend to tip the extended end of the ramp downwardly. This force will be opposed by the spring 63, which tends to hold the chain in a straight line between the sprockets 54 and 56. When the overhanging weight of the ramp is sufficient, the ramp will tilt, compressing spring 63. When spring 63 is completely collapsed, the movement of the ramp to ground engaging position will be positively controlled. When the foot 27 engages the ground and the trailing end of the ramp reaches the car end, rod 68 will strike switch 70 stopping the motor. The bridge 25 will be swung about its hinge from a position overlying the ramp end to a position as an extension of the ramp.

When the two ramps are down, the brace bar 74 is locked between them and the jacks 28 are operated to level the ramps and properly position the bridges 25. The ramps will be held in extended position by lock pins 30 being inserted in openings 33 at the car end.

Trailers may be backed up the ramp onto the ramp car, and from the ramp car to a connected car for transportation. The bridges of the ramps at the opposite end of the ramp car may be swung across the space between the ramp car and the next car to support trailers moving from one car to another.

After all trailers are loaded, or unloaded, the ramps are raised for stowing. Lock pins 30 are removed, jacks 28 lowered, if required, and bridges 25 swung back to lie upon the ramp ends. Motors 40 are started and a reverse action takes place. The load now will be upon sprocket 54 and its spring 63 will be compressed. As the ramp begins its upward movement, its end connected to the chain will rise (as shown in FIGURE 6) so that the chain will no longer occupy a straight line position between sprockets 57 and 54 but will follow an angular path. This will require additional chain length which will be supplied by compensating movement of the tensioning sprockets. When the ramp reaches a point of equilibrium (as seen in FIGURE 6), the downward component of the pulling force exerted by chain 39 will overcome the weight of the overhanging portion of the ramp and draw the ramp into a horizontal position. As the chain path lessens, the tensioning sprockets will move outwardly to prevent slack. Further movement will roll the ramp to fully stowed position, whereupon rod 68 will strike limit switch 69 and stop the motor. The ramps will be locked in position by inserting pins 30 in the openings 32 in the plates 12.

In all movement of the ramp, the tensioning sprockets will operate to compensate for chain pull and ramp weight and tilting movement. The two will act together to maintain proper chain tension. When a load in one direction is very heavy, the tension sprocket on the side of the driving gear in the driving direction will collapse, or bottom, its spring to take the load. Further compensation will then be made by the other tension sprocket to provide increased chain length. The two, working together will automatically maintain proper counterbalancing action and proper tension on the chain under all circumstances.

While in the above one practical embodiment of the invention has been disclosed, it will be understood that the specific detailed construction shown and described is merely by way of example, and the structure may take other forms within the scope of the appended claims.

What is claimed is:

1. A ramp car comprising, a car frame mounted upon trucks, spaced parallel runways extending the length of the car frame, guide rollers at the end of each runway, a ramp associated with each runway at one end of the car and movable over the roller from an operative position as a declining extension of the runway to the ground to a stowed position overlying the runway end, and means to move the ramps to and from the said positions including an endless chain attached to the end of the ramps farthest removed from the car end when the ramps are in stowed position, the chain travelling over a drive sprocket and a guide sprocket spaced longitudinally of the car with the guide sprocket being adjacent the car end with which the ramps are associated and the drive sprocket being inwardly of the ramp end to which the chain is attached when the ramps are in stowed position, chain tensioning means biased toward chain tightening position located on each side of the drive sprocket and movable under ramp weight to permit tilting of the ramp and counterbalance ramp weight, and means to drive the drive sprocket.

2. A ramp car as claimed in claim 1, wherein the guide sprocket and one of the tensioning means lie in a common horizontal plane and define a flight path for that portion of the chain including the attachment to the ramp ends.

3. A ramp car as claimed in claim 2, wherein there are limit switches located adjacent the position of chain attachment to the ramps when the ramps are in said positions of movement operative to discontinue operation of the means to drive the drive sprocket, and control rods carried by the ramps to contact and operate the switches when the ramps are at their said respective positions.

4. A ramp car as claimed in claim 1, wherein there are duplicate ramps associated with the runways at the opposite ends of the car, and duplicate means to move the ramps at the said opposite end of the car to said positions.

5. A ramp car as claimed in claim 4, wherein each ramp has a bridge plate hingedly connected to its end adjacent the car end when the ramp is in stowed position, the bridge plates being movable about their hinges to provide extensions for the ramps when the ramps are in operative position, and to provide cross-over bridges from the ramp car to a car coupled to the ramp car when the ramps are in stowed position.

6. A ramp car as claimed in claim 4, wherein each ramp has a separate means to move it from operative to stowed position.

7. A ramp car as claimed in claim 1, wherein there are means to lock the ramp to the car in the operative and stowed positions.

8. A ramp car comprising, a car frame mounted upon trucks, spaced parallel runways extending the length of the car frame, guide rollers at the ends of the runways, a ramp associated with each runway at one end of the car and movable over the guide roller from an operative position as a declining extension of the runway to the ground to a stowed position overlying the runway end, and individual means to move the ramps to and from said positions, each ramp-moving means including, an endless chain attached to the end of a ramp farthest removed from the car end when the ramp is in stowed position, the chain travelling over a guide sprocket at the end of the car and a chain moving and ramp counterbalancing assembly spaced inwardly of the car from the ramp end in stowed position, the chain moving and ramp counterbalancing assembly including a drive sprocket around which the chain passes and a pair of chain tensioning sprockets in engagement with the chain above and below the drive sprocket, and means to independently bias the tensioning sprockets in a direction away from the guide sprocket.

9. A ramp car as claimed in claim 8, wherein the biasing means for the tensioning sprockets are coiled springs.

10. A ramp car as claimed in claim 8, wherein the guide sprocket and the tensioning sprocket above the drive sprocket are located on a common plane to define a flight path for that portion of the chain including the attachment to the ramp.

References Cited in the file of this patent

UNITED STATES PATENTS

| | | |
|---|---|---|
| 1,592,315 | Wallace | July 13, 1926 |
| 2,653,679 | Hamilton | Sept. 29, 1953 |
| 2,697,530 | Claessens | Dec. 21, 1954 |
| 3,027,580 | Haack | Apr. 3, 1962 |

FOREIGN PATENTS

| | | |
|---|---|---|
| 108,156 | Australia | Aug. 2, 1959 |
| 513,598 | Great Britain | Oct. 17, 1939 |